(12) United States Patent
Park et al.

(10) Patent No.: US 11,003,540 B2
(45) Date of Patent: May 11, 2021

(54) METHOD, SERVER, AND COMPUTER READABLE MEDIUM FOR INDEX RECOVERY USING INDEX REDO LOG

(71) Applicant: TmaxData Co., Ltd., Gyeonggi-do (KR)

(72) Inventors: Sang Young Park, Seoul (KR); Taikyoung Kim, Gyeonggi-do (KR); Hakyong Lee, Gyeonggi-do (KR); Jaemin Oh, Gyeonggi-do (KR); Jaehyeong Cho, Gyeonggi-do (KR)

(73) Assignee: TMAX DATA CO., LTD., Gyeonggi-Do (KR)

( * ) Notice: Subject to any disclaimer, the term of this patent is extended or adjusted under 35 U.S.C. 154(b) by 131 days.

(21) Appl. No.: 16/577,604

(22) Filed: Sep. 20, 2019

(65) Prior Publication Data
US 2021/0089401 A1 Mar. 25, 2021

(30) Foreign Application Priority Data
Sep. 19, 2019 (KR) .................. 10-2019-0115158

(51) Int. Cl.
*G06F 12/00* (2006.01)
*G06F 13/00* (2006.01)
(Continued)

(52) U.S. Cl.
CPC ...... *G06F 11/1435* (2013.01); *G06F 11/1451* (2013.01); *G06F 11/1469* (2013.01);
(Continued)

(58) Field of Classification Search
CPC ............. G06F 16/1865; G06F 11/1451; G06F 11/1469; G06F 11/1435
(Continued)

(56) References Cited

U.S. PATENT DOCUMENTS

2010/0083273 A1 4/2010 Sihn et al.
2010/0211554 A1* 8/2010 Reid .................. G06F 16/2358
707/703

(Continued)

*Primary Examiner* — Edward J Dudek, Jr.
*Assistant Examiner* — Sidney Li
(74) *Attorney, Agent, or Firm* — Umberg Zipser LLP

(57) ABSTRACT

According to some exemplary embodiments of the present disclosure, a method for index recovery performed by a database server is disclosed.
The method is an index redo logging method performed by a database server. The method may include performing a first recovery step of determining, by an instruction for recovering via an index redo log comprising an index physical redo log and an index logical redo log, an index tree structure by applying the index physical redo log, wherein the index physical redo log is generated by first index redo logging corresponding to a change of the index tree structure; and performing a second recovery step of performing an index tree search on the determined index tree structure to obtain physical information of the index logical redo log, and applying the index logical redo log to the determined index tree structure using the obtained physical information, wherein the index logical redo log is generated by second index redo logging corresponding to a data change in the index or generated based on a table redo log by the instruction for recovering.

19 Claims, 10 Drawing Sheets

(51) Int. Cl.
  *G06F 13/28*  (2006.01)
  *G06F 11/14*  (2006.01)
  *G06F 16/18*  (2019.01)
  *G06F 16/17*  (2019.01)
(52) U.S. Cl.
  CPC ...... *G06F 16/1734* (2019.01); *G06F 16/1865* (2019.01); *G06F 2201/80* (2013.01)
(58) Field of Classification Search
  USPC ........................................................ 711/162
  See application file for complete search history.

(56) References Cited

U.S. PATENT DOCUMENTS

2014/0089624 A1     3/2014  Ffrench
2016/0357639 A1*   12/2016  Winokur ............. G06F 11/1446

* cited by examiner

METHOD, SERVER, AND COMPUTER READABLE MEDIUM FOR INDEX RECOVERY USING INDEX REDO LOG

CROSS-REFERENCE TO RELATED APPLICATIONS

This application claims priority to and the benefit of Korean Patent Application No. 10-2019-0115158 filed in the Korean Intellectual Property Office on Sep. 19, 2019, the entire contents of which are incorporated herein by reference.

TECHNICAL FIELD

The present invention relates to a database, and more particularly, to an index recovery using an index redo log.

BACKGROUND ART

Corporate business is expanding rapidly with an explosive increase in the quantity of data and the emergence of various environments and platforms. As new business environments arrive, more efficient and flexible data services, information processing, and data management capabilities are required. In response to these changes, research on a database to solve the high performance, high availability and scalability problems that are the foundation of implementing enterprise businesses continues.

In a database management system (DBMS), data can be stored in a data store. In a relational database management system (RDBMS), such a data store may be referred to as a table. Such a table may include one or more rows and each of the one or more rows may include one or more columns.

If the database contains a large quantity of data, it may take a relatively long time to execute a query to retrieve data requested by a user. If the database takes a long time to respond to a query, it can adversely affect the performance of the database. Therefore, various techniques have been studied in this technical field to reduce a processing time for a response to a query, that is, to improve the performance of the database management system.

In order to increase a data retrieval rate from a database, indexing techniques can be utilized. Such an index may refer to a data structure causing an operation rate on a table to be increased in a database field. When the index is utilized, for not only a time spent on data retrieval, the amount of resources also used for data retrieval are reduced.

The database management system uses logging techniques of generating log data to ensure data integrity, confidentiality, and availability. Currently, databases are managed on a large scale, and the amount of transactions executed by accessing the databases is increasing exponentially. Accordingly, the volume of log data is also increasing exponentially.

If the volume of log data increases, the I/O of a disk increases, and this adversely affects the overall performance of the database. Thus, a research on a technique for reducing the volume of log data is required.

SUMMARY OF THE INVENTION

The present disclosure has been made in an effort in response to the above-described background, to provide a method, a server, and a computer readable medium for index recovery using an index redo log in order to reduce the volume of log data.

The technical problems of the present disclosure are not limited to the technical problems mentioned above, and other not-mentioned technical problems will be clearly understood by those skilled in the art from the following descriptions.

To solve the above-described problems, according to some exemplary embodiments of the present disclosure, a method for index recovery performed by a database server is disclosed.

The method for index recovery performed by a database server may include performing a first recovery step of determining, by an instruction for recovering via an index redo log including an index physical redo log and an index logical redo log, an index tree structure by applying the index physical redo log, in which the index physical redo log is generated by first index redo logging corresponding to a change of the index tree structure and performing a second recovery step of performing an index tree search on the determined index tree structure to obtain physical information of the index logical redo log, and applying the index logical redo log to the determined index tree structure using the obtained physical information, in which the index logical redo log is generated by second index redo logging corresponding to a data change in the index or generated based on a table redo log by the instruction for recovering.

The index logical redo log may be generated by excluding at least the physical information among indexing instruction information for a transaction during the second index redo logging.

The index logical redo log may be generated using operation information and data value information included in the table redo log when the index logical redo log is generated by the instruction for recovering.

The index physical redo log and the index logical redo log may be distinguished by a presence or absence of the physical information.

The index physical redo log may include index structure change information corresponding to an index split operation or an index coalesce operation.

The index structure change information may include data information of a node which is added or deleted by changing the index tree structure.

The index logical redo log may include index data change information corresponding to an operation of inserting, deleting, or changing a data value of the index.

The index physical redo log may include at least one of physical information, target index information, operation information, or index data value information, and the index logical redo log may include at least one of the target index information, the operation information, or the index data value information.

A generation time of the index logical redo log may be variable before or after an occurrence time of the instruction for recovering.

To solve the above-described problems, according to some exemplary embodiments of the present disclosure, a database server for performing an index redo logging method is disclosed.

The database server for performing an index recovery method includes a processor and a storage unit. The processor may perform a first recovery step of determining, by an instruction for recovering via an index redo log including an index physical redo log and an index logical redo log, an index tree structure by applying the index physical redo log, in which the index physical redo log is generated by first index redo logging corresponding to a change of the index tree structure; and a second recovery step of performing an index tree search on the determined index tree structure to obtain physical information of the index logical redo log, and applying the index logical redo log to the determined index tree structure using the obtained physical information, in which the index logical redo log is generated by second index redo logging corresponding to a data change in the index or generated based on a table redo log by the instruction for recovering.

The index logical redo log may be generated by excluding at least the physical information among indexing instruction information for a transaction during the second index redo logging.

The processor may generate the index logical redo log using operation information and data value information included in the table redo log when the index logical redo log is generated by the instruction for recovering.

The index physical redo log and the index logical redo log may be distinguished by a presence or absence of the physical information.

The index physical redo log may include index structure change information corresponding to an index split operation or an index coalesce operation.

The index structure change information may include data information of a node which is added or deleted by changing the index tree structure.

The index logical redo log includes index data change information corresponding to an operation of inserting, deleting, or changing data in the index.

The index physical redo log may include at least one of physical information, target index information, operation information, or index data value information, and the index logical redo log may include at least one of the target index information, the operation information, or the index data value information.

A generation time of the index logical redo log may be variable before or after an occurrence time of the instruction for recovering.

To solve the above-described problems, according to some exemplary embodiments of the present disclosure, a computer readable medium having recorded thereon a program executable by a processor to perform an index recovery method is disclosed.

The computer readable medium having recorded thereon a program executable by a processor to perform a method for recovery of an index. The method may include a first recovery step of determining, by an instruction for recovering via an index redo log including an index physical redo log and an index logical redo log, an index tree structure by applying the index physical redo log, in which the index physical redo log is generated by first index redo logging corresponding to a change of the index tree structure; and a second recovery step of performing an index tree search on the determined index tree structure to obtain physical information of the index logical redo log, and applying the index logical redo log to the determined index tree structure using the obtained physical information, in which the index logical redo log is generated by second index redo logging corresponding to a data change in the index or generated based on a table redo log by the instruction for recovering.

The technical solutions obtained in the present disclosure are not limited to the above-mentioned solutions, and other not-mentioned solutions are clearly understood by those skilled in the art from the following descriptions.

The present disclosure may provide a method, a server, and a computer readable medium for index recovery using an index redo log including an index physical redo log and an index logical redo log.

The effects obtained from the present disclosure are not limited to those mentioned above, and other effects which are not mentioned above may be clearly understood by those skilled in the art from the following descriptions.

BRIEF DESCRIPTION OF THE DRAWINGS

Various aspects will be described with reference to the drawings, in which similar reference numerals are used to refer to similar components. In the following examples, for purposes of explanation, multiple specific details are set forth in order to provide a thorough understanding of one or more aspects. However, it will be apparent that such aspect (s) may be practiced without the specific details.

DETAILED DESCRIPTION

Figure 1:
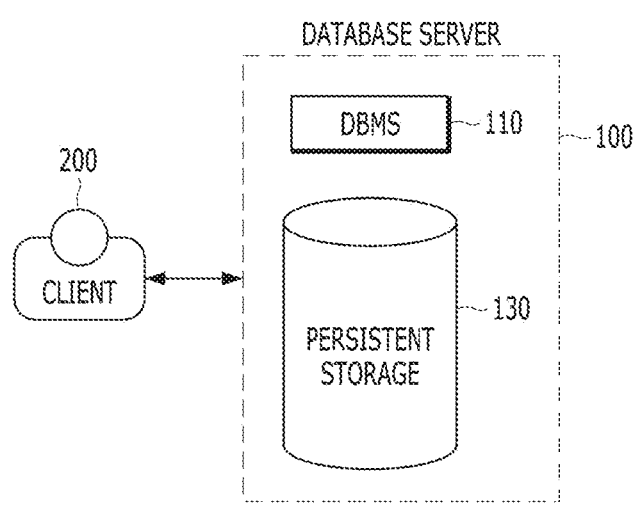
FIG. 1 is a schematic diagram illustrating a database system according to an exemplary embodiment of the present disclosure.

Various exemplary embodiments and/or various aspects will be disclosed with reference to the drawings. In the following descriptions, for explanation, multiple specific details are disclosed in order to provide overall understandings of one or more aspects. However, it will also be appreciated by those skilled in the art that this aspect(s) may be practiced without these specific details. The following descriptions and the accompanying drawings are provided for disclosing specific exemplary aspects of the one or more aspects in detail. However, these aspects are exemplary. Thus, some of the various methods in the principles of the various aspects may be used, and the descriptions are intended to include all such aspects and their equivalents.

Various aspects and features will be presented by a system that may include one or more apparatuses, terminals, servers, devices, components and/or modules, and the like. It should be understood and appreciated that various systems may include additional apparatuses, terminals, servers, devices, components and/or modules, and the like and/or may not include all of the apparatuses, terminals, servers, devices, components, modules, and the like described with reference to the drawings.

The scope for the method in the claims of the present disclosure is generated by the functions and features described in the respective steps, and is not influenced by the order of description of each step in the claims so long as the order of precedence is not specified in the steps constituting the method. For example, in claims described by a method including Steps A and B, even if Step A is described before Step B, the scope of the right is not limited to that even if Step A is to precede Step B.

The terms of "a computer program", "a component", "a module", "a system", and the like used in this specification may be used interchangeably, and refer to computer-related entities, hardware, firmware, software, combinations of software and hardware, or the execution of software. For example, a component may be a procedure running on a processor, a processor, an object, an execution thread, a program, and/or a computer, but the present disclosure is not limited thereto. For example, both an application running on a computing device and the computing device may be a component. One or more components may be provided in a processor and/or an execution thread. One component may be localized within one computer. One component may be distributed between two or more computers.

The components may be performed from various computer readable media having various data structures stored thereon. For example, the components may communicate with each other by local or remote processes with a signal including one or more data packets (for example, data from one component interacting with other components in a local system, a distributed system, or the like and/or data transmitted to other systems via a network such as the Internet, using a signal).

"The exemplary embodiment", "an example", "an aspect", and the like used in this specification may not be construed as any aspect or design described being better or advantageous than other aspects or designs. The terms of "a component", "a module", "a system", "an interface", and the like used below generally mean computer-related entities, for example, may mean hardware, a combination of hardware and software, or software.

The term of "or" is intended to mean not an exclusive "or" but an inclusive "or". That is, unless specified or clear in context, "X uses A or B" is intended to mean one of the natural implicit substitutions. That is, "X uses A or B" can be applied to any of the cases where X uses A, X uses B, or X uses both A and B. Moreover, it is to be understood that the term of "and/or" used in this specification refers to and includes all possible combinations of one or more of the listed related items.

It is to be understood that the terms of "comprises" and/or "comprising" mean that the feature and/or a component is provided, but one or more other features, other components and/or the presence or addition of groups thereof are not excluded. In addition, unless specified or clear in the context of indicating a singular form, the singular in this specification and claims should generally be construed to mean "one or more".

Computer-readable media in this specification can include any kind of storage media on which programs and data are stored to be enabled to be read by a computer system. Computer readable media in the present disclosure may include computer readable storage media and computer readable transmission media. According to one aspect of the present invention, a computer readable medium may include: a read only memory (ROM), a random access memory (RAM), a compact disk (CD)-ROM, a digital video disk (DVD)-ROM, a magnetic tape, a floppy disk, an optical data storage device, and the like. In addition, the computer readable transmission medium may include any transmission-available type of medium implemented in the form of a carrier wave (for example, transmission over the Internet. Additionally, such computer readable media may be distributed in systems connected to each other via a network, so as to store computer readable codes and/or instructions in a distributed manner.

Before describing the details for carrying out the present invention, it should be noted that the configuration that is not directly related to the technical gist of the present invention has been omitted within the scope without departing from the technical gist of the present invention. In addition, the terms or words used in this specification and claims should be construed as meanings and concepts to comply with the technical spirit of the present invention based on the principle that the inventor can define the concept of appropriate terms in order to best explain the invention. It should be interpreted as a concept.

In this specification, the database refers to a system that stores data related to each other in a form that can be processed by a computer. The database can store data and answer user questions, and the data stored in the database can be changed. The database can store new data, and delete and change existing data.

In this specification, a query means any request or command for requesting processing in a database server, and may include, for example, the data manipulation language (DML), the data definition language (DDL) and/or PL/SQL, and the like. In addition, the query in this specification may mean any request issued from a user/developer or the like. In addition, a query may mean any request that is entered into a user terminal and/or a database server and processed at the user terminal and/or a database server.

In this specification, a transaction refers to a continuous processing unit for a series of tasks such as exchanging information or updating a database. The transaction may be defined as a basic unit of a task to complete the requested work while ensuring the integrity of the database.

In this specification, "a log", "log data", "a log record", and "log information" may be used interchangeably with each other depending on the situation. The log records in this specification refer to records for redo logs and/or undo logs. The log records may include any type of data record that allows changes to values, structures, and organization of data in a database (for example, changes to tables, columns, and rows, data type, and an index) to be identified.

In this specification, log data refers to data in which contents regarding data change such as an occurrence of a transaction or generation of operation information during database operation are recorded. The log data may include redo log data and undo log data.

The redo log data refers to data required to recover a failure occurring in a database.

Types of recovery using redo log data include: media recovery used for database recovery when media failure occurs when a disk is physically damaged; and instance recovery used for preparing loss of transaction data when an instance terminates abnormally. However, the types of recovery using redo log data are not limited thereto.

The undo log data refers to data required to undo the task performed on the database. For example, in a case where a database management system cancels a transaction applied to a database, the undo log data may be required. Although the present disclosure will mainly describe exemplary embodiments for the redo log data, the present disclosure may be used for undo log data.

The descriptions of the presented exemplary embodiments are provided to enable any person skilled in the art to use or realize the present invention. Various modifications to the exemplary embodiments will be apparent to those skilled in the art, and the generic principles defined herein may be applied to other exemplary embodiments without departing from the scope of the invention. Thus, it should be construed that the present invention is not be limited to the exemplary embodiments presented herein, but is in the broadest scope consistent with the principles and novel features presented herein.

FIG. 1 is a schematic diagram illustrating a database system 10 according to an exemplary embodiment of the present disclosure.

As illustrated in FIG. 1, the database system 10 according to the present disclosure may include a client 200 and a database server 100. In this specification, the database server 100 may be used interchangeably with a database.

As illustrated in FIG. 1, the client 200 may refer to a node(s) in the database system 10, which has a mechanism for performing a communication via a network. For example, the client 200 may include a PC, a laptop computer, a workstation, a terminal, and/or any electronic device having network connectivity. In addition, the client 200 may include any server implemented by at least one of an agent, an application programming interface (API), or a plug-in. For example, in FIG. 1, the client 200 may be associated with a user (for example, database administration) using the database server 100. In this example, the client 200 may issue queries having various forms including a DML, a data definition language (DDL), and the like, to the database server 100. In this example, the client 200 may issue a query to the database server 100. In an example, in a case where the client 200 issues a query to the database server 100, the query may be processed in the database server 100 in a form of a transaction. That is, the client 200 may cause the database server 100 to generate and process a transaction. The client 200 may receive an application source written in a programming language by a developer or the like. In addition, for example, the client 200 may compile an application source to generate a client application. For example, the generated client application may be transferred to the database server 100 and then is optimized and executed.

For example, the database server 100 may include any type of computer system or computing device such as a microprocessor, a mainframe computer, a digital single processor, a portable device, and a device controller. Each of such database servers 100 may include a database management system (DBMS) 110 and a persistent storage 130.

Although FIG. 1 illustrates only one database server 100, it is apparent to those skilled in related art that more database servers may be also included in the range of the present invention, and the database server 100 may include additional components. That is, the database server 100 may be configured by a plurality of computing devices. A set of a plurality of nodes may constitute the database server 100. For example, although not illustrated in FIG. 1, the database server 100 may include one or more memories including a buffer cache. In addition, although not illustrated in FIG. 1, the database server 100 may include one or more processor 120. Thus, the DBMS 110 may operate on the memory by the processor 120.

In this specification, the memory may refer to a volatile storage device such as a random access memory (RAM) (for example, dynamic random access memory (DRAM) and static random access memory (SRAM)), that is a main storage device directly accessed by the processor and instantly erases stored information when the power is turned off. However, the memory is not limited thereto. Such a memory may operate by the processor 120. The memory may temporarily store a data table containing a data value. The data table may contain the data value. In the exemplary embodiment of the present invention, the data value in the data table may be recorded in the persistent storage 130 from the memory. In an additional aspect, the memory may include a buffer cache, and data may be stored in a data block of the buffer cache. Data stored in the buffer cache may be recorded in the persistent storage 130 by a background process.

The persistent storage 130 may refer to, for example, a non-volatile storage medium such as a storage device based on a flash memory and/or a battery-backup memory, which is capable of continuously storing any kind of data, in addition to a magnetic disk, an optical disk, and a magneto-optical storage device. Such a persistent storage 130 may communicate with the processor 120 and the memory of the database server 100 through various communication units. In an additional example, the persistent storage 130 may be located outside the database server 100 to be capable of communicating with the database server 100. According to the exemplary embodiment of the present disclosure, the persistent storage 130 and the memory may be collectively referred to as a storage unit 140.

The DBMS 110 refers to a program for allowing the database server 100 to perform operations such as parsing of queries, retrieving, inserting, modifying, deleting of required data, and creating and/or accessing indexes. As described above, the DBMS 110 may be implemented by the processor 120 in the memory of the database server 100.

The client 200 and the database server 100, or database servers may communicate with each other via a network (not illustrated). According to the exemplar)/embodiment of the present invention, various wired communication system such as a public switched telephone network (PSTN), an x digital subscriber line (xDSL), a rate adaptive DSL (RADSL), a multi rate DSL (MDSL), a very high speed DSL (VDSL), a universal asymmetric DSL (UADSL), a high bit rate DSL (HDSL), and a local area network (LAN) may be used as the network.

Various radio communication systems such as a code division multi access (CDMA), a time division multi access (TDMA), a frequency division multi access (FDMA), an orthogonal frequency division multi access (OFDMA), a single carrier-FDMA (SC-FDMA), and other systems may be used as the network presented in this specification. For example, the network may include a database link (dblink). Thus, a plurality of database servers may communicate with each other via such a database link to take data from another database server 100. The techniques described herein may be used in other networks in addition to the above-mentioned networks.

In a database management system, "a transaction" is generally referred to as an atomic set of operations performed on a database and means a set of operations. The database system ensures atomicity, consistency, isolation, and durability for transactions. More specifically, atomicity refers to characteristics for All or Nothing that ensures a state where all operations in a transaction are normally completed, or no operation is performed. Consistency refers to characteristics that, when the execution of a transaction is considered as a transition between states in a database, the states of the database before and after the transaction is to be different states from each other, each of which guarantees consistency. Isolation refers to characteristics that, even though multiple transactions are simultaneously performed, each transaction is to be executed independently without affecting the execution of other transactions. In addition, durability refers to characteristics that all changes for a transaction after the transaction is successfully completed and committed are to be preserved when a problem occurs later.

For example, in a case where a transaction is processed, the transaction may access a table, an index, data, and/or metadata or may create, modify, or delete the table, the index, the data, and/or the metadata. A commit is made when processing of a transaction is completed. In such a case, any change/update to the database by the transaction may be (permanently) applied to the database system. Since the transaction is an atomic set, all operations relating to a specific transaction may be simultaneously committed. In addition, in a case where it is not possible to execute some or all of the operations made by the transaction, not just a specific operation that fails, but the entirety of the transaction is aborted. In a case where the transaction is aborted, any change to the database, which has been made by the transaction may be rolled back, and thus the database may be brought back to the state before the aborted transaction.

Generally, a log refers to a continuous set of log records and may be used for recording a change-related operation. Generally, the log is recorded in an appended manner, and each log record may have a unique identifier. The identifier of the log record may be referred to as a log sequence number (LSN) or a log sequence address (LSA), As described above, since the log is recorded in an appended manner, the log identifier may have a monotonically increasing characteristic.

Log records of a transaction may be used for performing an appropriate recovery operation in an event such as system failure or abortion of a transaction. The log records of a transaction, which have different types may be provided in the database system.

A "redo" record refers to log information for recording all changes performed on the database. According to write ahead logging (WAL), each change to data is firstly recorded in a redo log, and the actual change to the database block, which corresponds to the changed data is performed later. Such WAL, can prevent an occurrence of a situation in which, when system failure occurs, the version of database data which is immediately recovered from a disk does not correctly reflect the latest state of the database. In addition, data change which is not recorded in a disk before failure, that is, which is performed on only a cache may be provided. Thus, if the redo log appropriately maintains such changes stored only in the cache, the system can be recovered in a manner (roll forward manner) in which the redo log is applied to the database until the state of the database is consistent with a state immediately before the system failure. The redo log may be used for performing an operation of applying a task performed by the user for system recovery to the database again, when system failure occurs.

An "undo" record may be provided as another type of log record. The undo record may be referred to as "an undo" segment or "a roll-back" segment. The undo record includes information for rolling a specific database operation back. That is, the undo record may be used for reversely performing a database task performed by a user, and for bringing the task of the user back to the original state. In addition, in a case where "a rolling forward" process is applied to uncommitted change(s) in recovery, the undo record may be applied to delete the uncommitted change(s) (that is, brought back). In addition, in a case where a transaction is aborted, the undo record may be applied in order to bring the database back to the known state before the aborted transaction. In a case where a database uses multi-versioning to allow different transactions to view database data at different times, the undo record may be used for generating multiple versions of the database, which are consistent at different times.

For example, when failure in a database system occurs, a method of restarting and recovering the database system may be roughly configured by three steps. The first is a log analysis step. In the log analysis step, a time from which recovery on the database system starts, and transactions to be recovered may be determined while searching logs from the last check point to the latest log (end of log (EOL)). The second is a redo recovery step. In the redo recovery step, recovery may be performed using redo log from a time at which recovery is to be started to a failure occurrence time. The state of the database at a time at which redo recovery is completed may be identical to a state of the database at the failure occurrence time. That is, in the redo recovery step, a task of reproducing and restoring a situation as it is immediately before the failure occurs may be performed. The third is an undo recovery step. The undo recovery step refers to a step of performing undo recovery on logs that require undo recovery while searching the log backward from the latest time. In this step, a method of rolling one or more transactions back from the state of the database recovered up to the time of failure may be performed. In the present disclosure, an example of redo log data will be described. However, those skilled in the related art can easily apply the index recovery method in the present disclosure to an example of undo log data.

Figure 2:
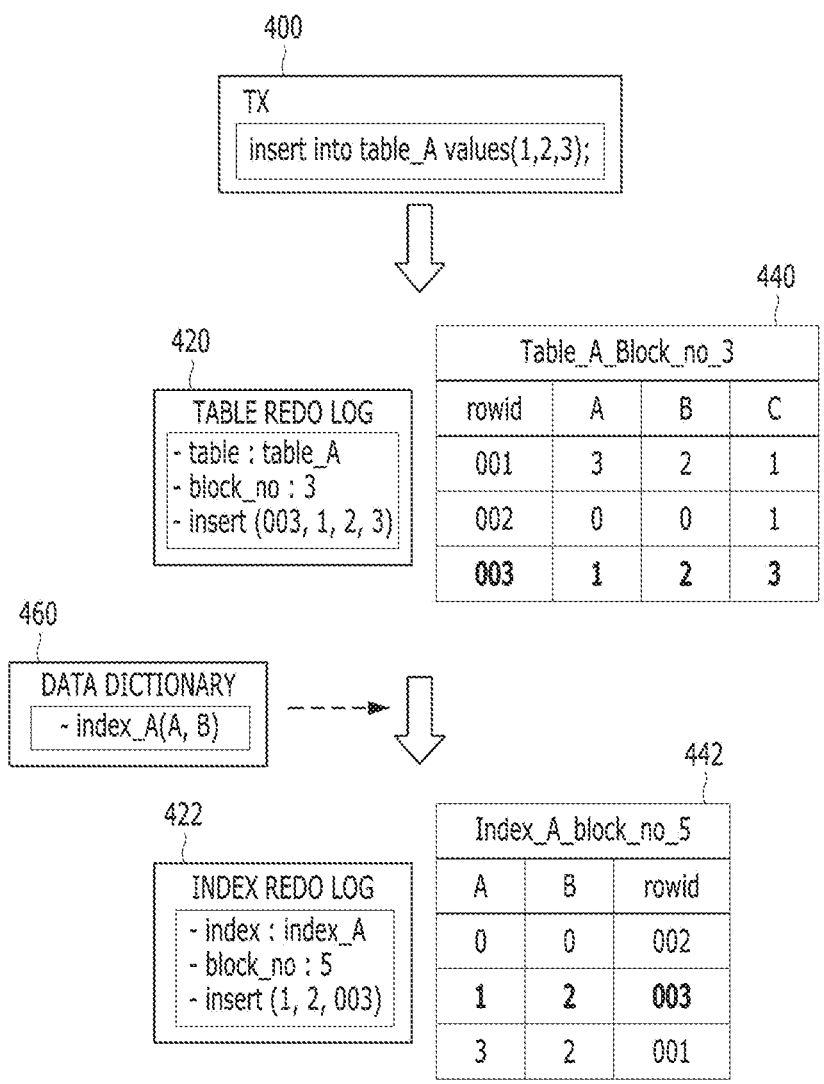
FIG. 2 is a diagram illustrating exemplary index redo logging.

FIG. 2 is a diagram illustrating exemplary index redo logging.

When a transaction is processed, a redo log (redo log record) is created for each operation in the transaction. For convenience, an operation on table may be referred to as a table transaction, and an operation on an index may be referred to as an index transaction. FIG. 2 illustrates an exemplary table redo log 420 and an exemplary index redo log 422 generated by an exemplary transaction 400. Before describing the details for index redo logging in FIG. 2, it should be noted that the configuration that is not directly related to the technical gist of the present invention has been omitted within the scope without departing from the technical gist of the present invention.

As illustrated in FIG. 2, for example, a transaction 400 may be a task of inserting data value "(1, 2, 3)" into a table "table_A". In this case, it is assumed that, if the transaction 400 is processed, the data value (1, 2, 3) may be inserted into columns A, B and C in a table block 440 having a table block number of 3 in "table_A", and a position at which the data values are inserted has a rowid value of "003".

As illustrated in FIG. 2, for example, the table redo log 420 for the transaction 400 may include target table information, table block number information, operation information, and data value information. The target table information may indicate a table in which the data value is stored. The table block number information may indicate a table block address at which the data value is stored. The operation information may indicate an operation performed by the transaction. The data value information may indicate the data value processed by the transaction.

With reference to FIG. 2, the target table information in the table redo log 420 generated by the transaction 400 may indicate "table_A". In addition, the table block number information in the table redo log 420 may indicate "3". In addition, in the table redo log 420, the operation information may indicate "insert", and the data value may indicate "(1, 2, 3)".

In a case where an index is used for a table, index redo logging is performed to create an index redo log by index update. With reference to FIG. 2, a data dictionary may provide index information (for example, index_A (A, B)) indicating that "index_A" has been generated for the columns "A" and "B" in "Table_A". The data dictionary may provide various kinds of information for database management. The data dictionary may provide structure information (for example, meta data) of the database and may be automatically updated when a query is issued. For example, as described above, the data dictionary may provide information regarding an index.

In a case where the transaction is processed, and thus the table is changed, the index may be updated by reflecting the change of the table in accordance with index information provided by the data dictionary. For example, as illustrated in FIG. 2, the data dictionary may provide index information (that is, "index_A (A, B)") indicating that "index_A" has been generated for the columns "A" and "B", and thus an index "index_A" may be updated by reflecting the change of the table.

As illustrated in FIG. 2, it is assumed that, in a case where a table block 440 having a table block number of 3 is changed by the transaction 400, an index block 442 having an index block number of 5 is updated by reflecting the change of the table. Specifically, as illustrated in FIG. 2, index key values of "(1, 2)" and the rowid value of "003" may be inserted into the second row in the index block 442 having an index block number of 5 by the transaction 400.

Here, the index block number may refer to an address of an index block constituting an index tree structure. In a case where an index key value is provided, the position (for example, index block address) on the index tree structure, into which the index key value is inserted may be determined by index search.

Various index tree structures and various index search methods in accordance with an index algorithm to be used may be provided. For example, the index algorithm may include a B-tree index, a Hash index, an R-tree index, a Fractal-tree index, a BITMAP index, and a function-based index. However, the present disclosure is not limited thereto, and various index algorithms may be used. In the present disclosure, the specific contents of the index algorithm will be omitted, and only the results will be described within a range for describing index redo logging.

As illustrated in FIG. 2, for example, the index redo log 422 for the transaction 400 may include target index information, index block number information, operation information, index key value information, and rowid value information. The target index information may indicate an index to be updated. The index block number information may indicate an address of an index block in which the index key value information and the rowid value information are stored. The operation information may indicate an operation performed by the transaction. The data value information may indicate the data value processed by the transaction.

With reference to FIG. 2, in the index redo log 422 generated by the transaction 400, the target index information indicates "index_A", the index block number information indicates "5", the operation information indicates "insert", and the index key value and the rowid value indicates "(1, 2, 003)".

The index logging method described with reference to FIG. 2 is provided just for illustrative purposes. Index logging may be performed in various manners according to the used index algorithms as described above.

Figure 3A:
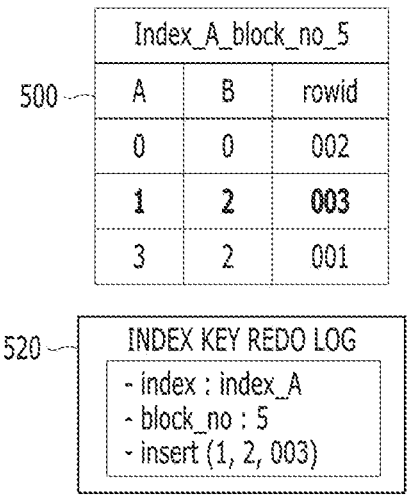
FIGS. 3A and 3B are diagrams illustrating an exemplary index redo log.
Figure 3B:
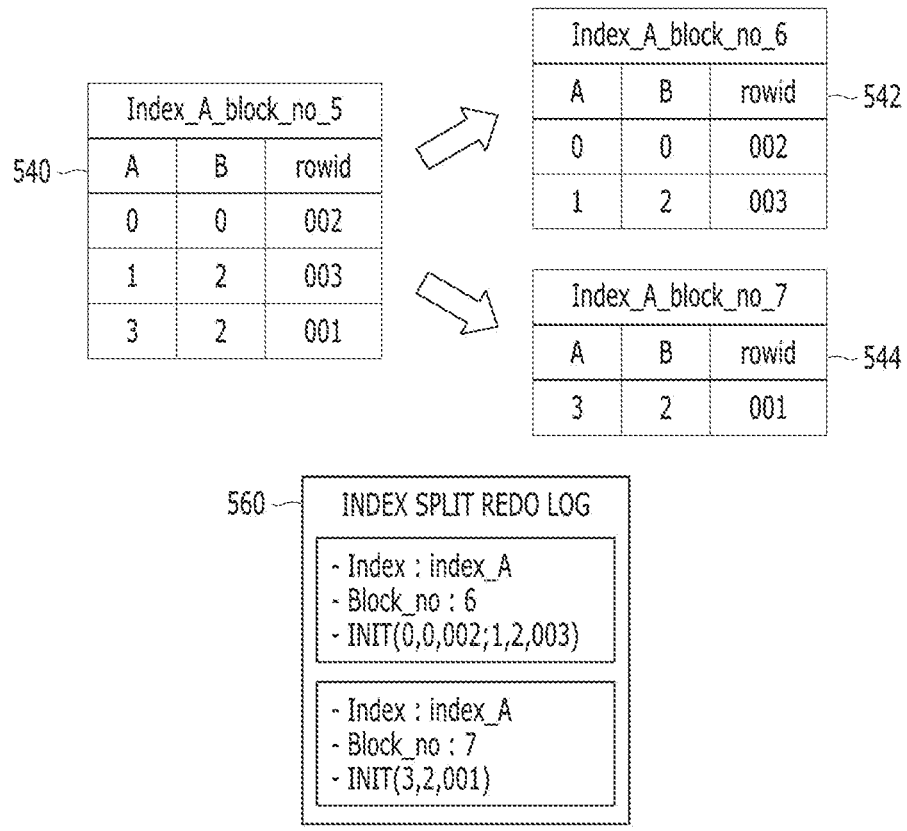

FIGS. 3A and 3B are diagrams illustrating an exemplary index redo log.

The inventor intends to roughly divide the index redo log into two types. The first type may refer to an index redo log (that is, the index tree structure is not changed in recovery) generated by a transaction of inserting, updating, and deleting values stored in indexes without changing the index tree structure. The second type may refer to an index redo log (that is, the index tree structure is changed in recovery) generated by a transaction of changing the index tree structure.

FIG. 3A illustrates an index redo log 520 corresponding to the first type. With reference to FIG. 3A, an exemplary index redo log 520 generated by an exemplary index transaction of inserting index values of "(1, 2)" and a rowid value of "(003)" into an index block 500 having an index block number of 5 in the index of "index_A" is provided.

In a case where the index redo log 520 corresponding to the first type is used for recovery, the index tree structure is not changed. Here, the change of the index tree structure may refer to a change in an index block unit. As illustrated in FIG. 3A, in a case where the index redo log 520 is used for recovery, the index values of "(1, 2)" and the rowid value of "(003)" may be inserted into the index block 500 having an index block number of 5 in the index of "index_A". That is, the index tree structure is not changed.

The index redo log of the first type may include, for example, an index key redo log of inserting, changing, and deleting a key value. The present disclosure is not limited thereto, and the index redo log of the first type may include various redo logs that do not change the index tree structure.

FIG. 3B illustrates an index redo log 560 corresponding to the second type. With reference to FIG. 3B, an exemplary index redo log 560 generated by an exemplary index transaction of splitting the index block 540 having an index block number of 5 into two blocks 542 and 544 by a certain transaction is provided.

As illustrated in FIG. 3B, in a case where the index redo log 560 corresponding to the second type is used for recovery, the index tree structure is changed. Here, the change of the index tree structure may refer to a change in an index block unit, as described above. The index tree structure may be changed in various manners in accordance with an index algorithm to be used. In this example, it is assumed that an exemplary transaction of splitting the index block 540 having an index block number of 5 into two index blocks 542 and 544 by a certain transaction is performed in accordance with a certain index algorithm. The index redo log 560 generated by the above-described exemplary transaction may be the index redo log 560 illustrated in FIG. 3B.

For example, the index redo log of the second type may include an index redo log for an operation of splitting an index block. In addition, the index redo log of the second type may include an index redo log for an operation (for example, coalesce instruction) of arranging an index. The present disclosure is not limited thereto, and the index redo log of the second type may include various redo logs that changes the index tree structure.

Since the index redo log of the first type and the index redo log of the second type are distinguished from each other, an index redo logging method in the present disclosure, in which it is possible to reduce the data volume of the index redo log may be considered. Specifically, in the index redo logging method in the present disclosure, a portion of the index redo log is generated in recovery, and thus it is possible to reduce the data volume of the index redo log. In addition, in the index redo logging method in the present disclosure, it is possible to reduce the data volume of the index redo log by using an index redo log of an improved type, which has a data volume smaller than the data volume of an index redo log in the related art.

Figure 4:
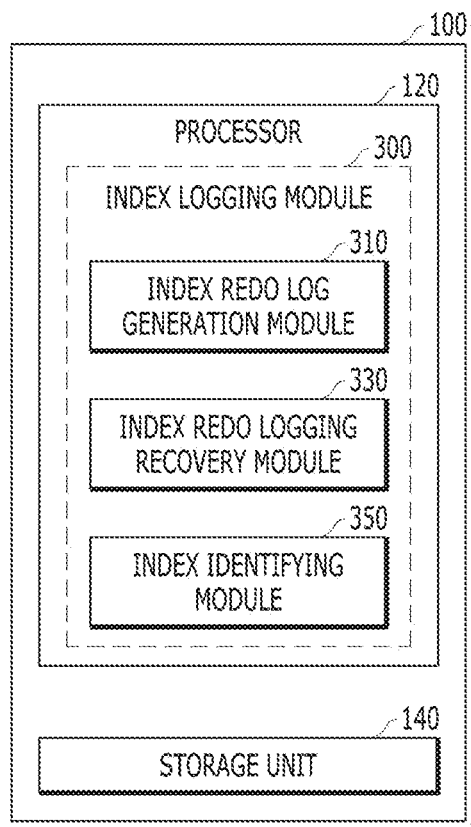
FIG. 4 is a block diagram illustrating a database server according to the exemplary embodiment of the present disclosure.
Figure 5:
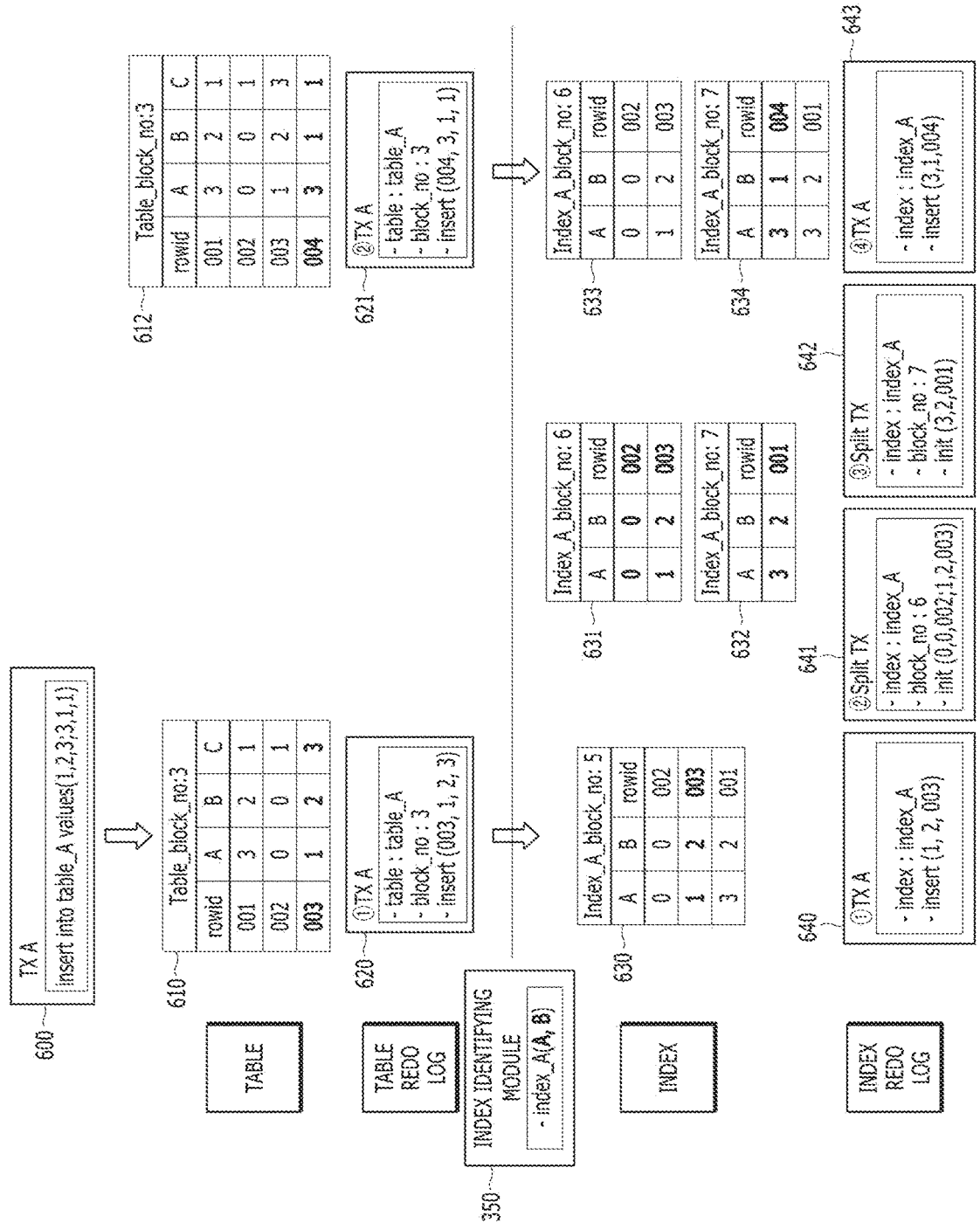
FIG. 5 is a diagram illustrating methods for index redo logging and index recovery according to some exemplary embodiments of the present disclosure.
Figure 6A:
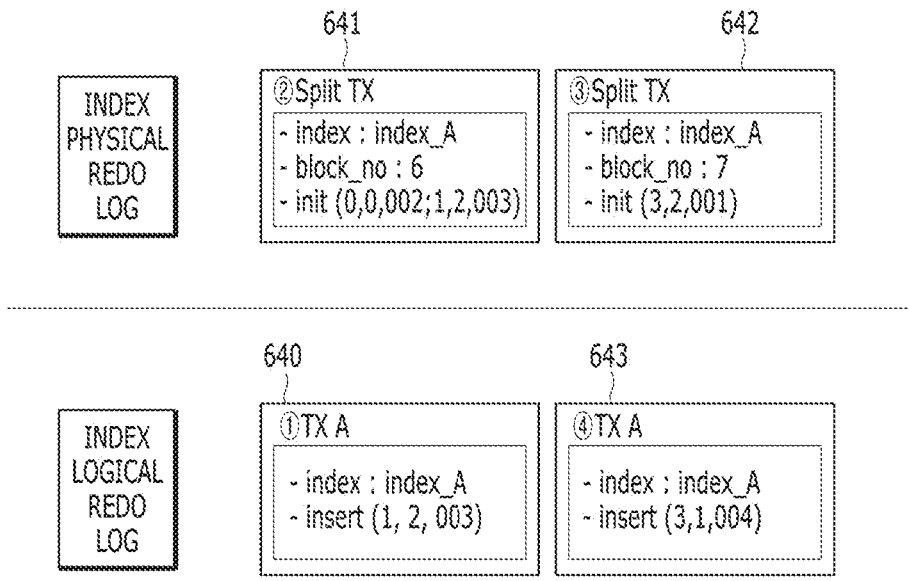
FIGS. 6A to 6C are diagrams illustrating the index redo log according to some exemplary embodiments of the present disclosure.
Figure 6B:
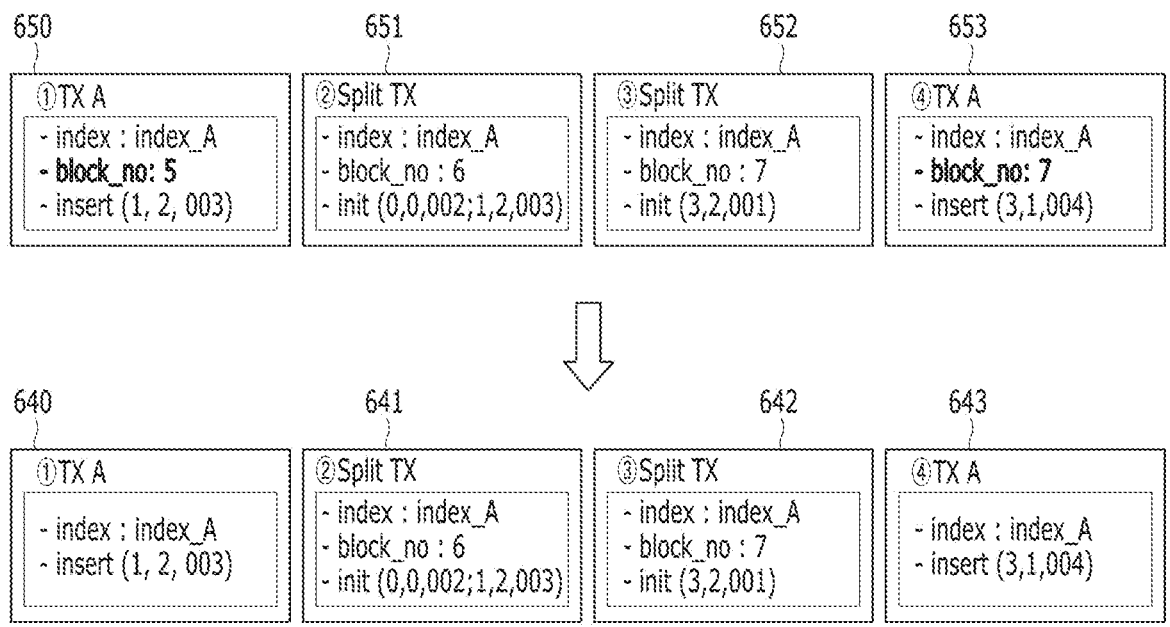
Figure 6C:
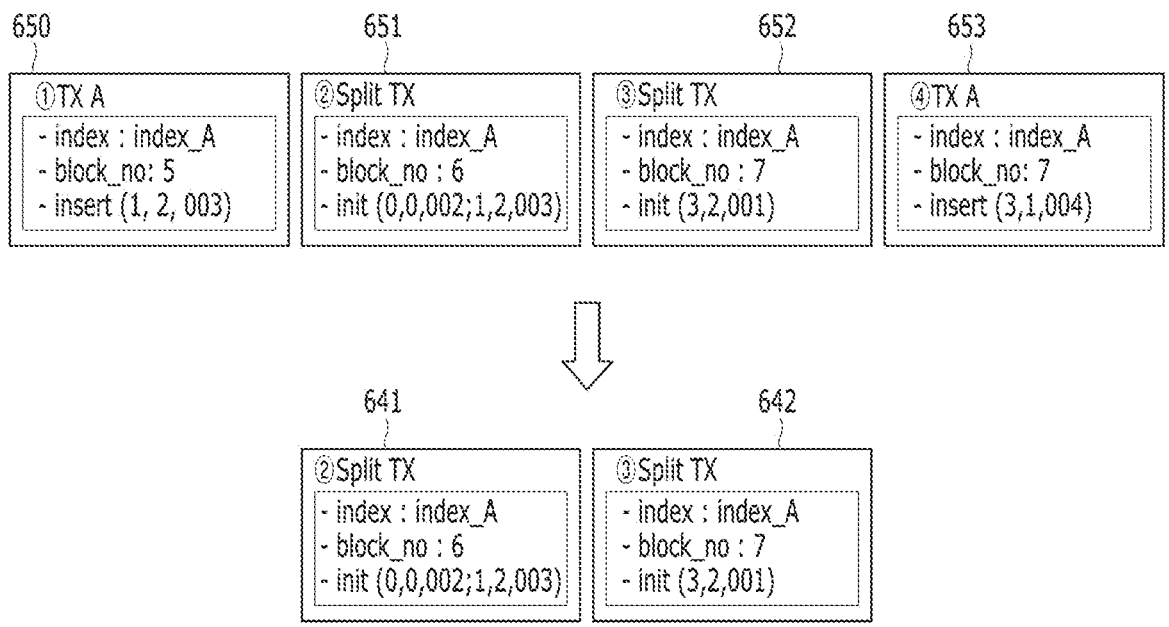
Figure 7:
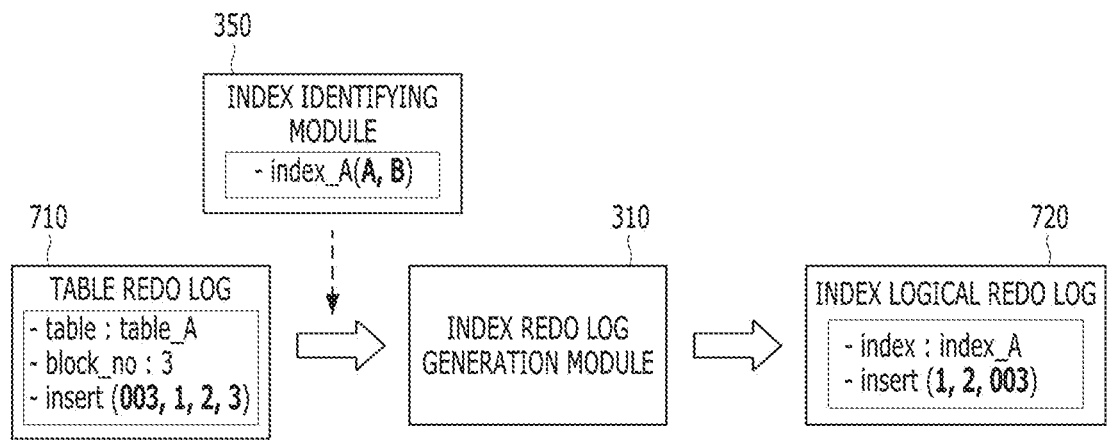
FIG. 7 is a diagram illustrating the method for index redo logging according to some exemplary embodiments of the present disclosure.

FIG. 4 is a block diagram illustrating the database server according to some exemplary embodiment of the present disclosure. FIG. 5 is a diagram illustrating index redo logging according to some exemplary embodiments of the present disclosure. FIGS. 6A to 6C are diagrams illustrating the index redo log according to some exemplary embodiments of the present disclosure. FIG. 7 is a diagram illustrating the method for generating an index redo log according to some exemplary embodiments of the present disclosure.

As illustrated in FIG. 4, the database server 100 may include the processor 120 and the storage unit 140. Here, as described above with reference to FIG. 1, the memory (not illustrated) and the persistent storage 130 may be collectively referred to as the storage unit 140. The DBMS 110 may be executed by the processor 120 to be stored in the memory and/or the persistent storage 130. In this case, the storage unit 140 may communicate with the processor 120 to control data storing/management.

An operation of recording log data in the persistent storage 130 may be performed by the processor 120. Specifically, the processor 120 may store log data in the persistent storage 130 by a background process. The background process may include a data buffer write process, a data block writer process, a checkpoint process, and a log writer process, and the present disclosure is not limited thereto.

The processor 120 may execute the DBMS 110 on the memory to perform various operations described below. In addition, the processor 120 may include one or more threads and cause each thread to perform a certain operation. For example, the processor 120 may generate an index tree structure for a certain table. In another example, the processor 120 may perform index search (traverse) for a target index key value in the generated index tree structure. The above-described operation of the processor 120 is just an example, and the present disclosure is not limited thereto.

According to some exemplary embodiments of the present disclosure, as illustrated in FIG. 4, the processor 120 may include an index logging module 300 that performs the index recovery method according to the present disclosure. The index logging module 300 may perform the overall operation for index redo logging and index recovery according to the present disclosure. For example, the index logging module 300 may generate an index redo log. In addition, the index logging module 300 may perform index recovery using the index redo log. The present disclosure is not limited thereto, and the index logging module 300 may perform various operations for index redo logging.

In the index recovery method according to the present disclosure, it is possible to reduce the data volume of the index redo log by using the index redo log including the index physical redo log and the index logical redo log. Specifically, in the index recovery method according to the present disclosure, it is possible to reduce the data volume of the index redo log by using an index logical redo log having a data volume smaller than the data volume of an index redo log in the related art. In addition, in the index recovery method according to the present disclosure, it is possible to reduce the total data volume of the index redo log by generating the index logical redo log during recovery.

The index redo logging and the index recovery method according to the present disclosure will be described below with reference to FIGS. 4 to 7.

According to some exemplary embodiments of the present disclosure, the index logging module 300 may include an index redo log generation module 310, an index redo logging recovery module 330, and an index identifying module 350.

According to some exemplary embodiments of the present disclosure, the index redo log generation module 310 may generate an index redo log (that is, perform index redo logging). Specifically, the index redo log generation module 310 may generate an index physical redo log and an index logical redo log.

The index physical redo log may be generated by first index redo logging (index redo logging) corresponding to a change of the index tree structure. Specifically, the index physical redo log may be a redo log generated by an index transaction of changing the index tree structure. The first index redo logging may refer to generation of an index redo log for an index transaction of changing an index tree structure, in index redo logging. Thus, the index physical redo log may include information (that is, index tree structure change information) for changing the index tree structure. Here, the change of the index tree structure may refer to a change in an index block unit. The index tree structure change information may be used for changing the index tree structure in recovery.

For example, the index physical redo log may include the index tree structure change information generated by an index transaction of splitting an index block. Here, the operation of splitting an index block may be referred to as an index split operation. In addition, the index physical redo log may include index tree structure change information generated by an index transaction of reconstructing an index tree structure in order to arrange indexes. Here, the operation of arranging indexes may be referred to as an index coalesce operation. However, the present disclosure is not limited thereto, and the index physical redo log may include index tree structure change information for various operations of changing the index tree structure.

The index structure change information may include data information of a node. The node may be added or deleted by changing the index tree structure. The change of the index tree structure includes a change to a configuration of nodes constituting the index tree structure. Thus, in a case where a node is added or deleted by changing the index tree structure, data value information of the node to be added or deleted is required in index recovery. Thus, the index structure change information may include data information of a node to be added or deleted by changing the index tree structure, and this information may be used in index recovery.

A node in the index tree structure may be included in one index table block. In addition, a plurality of nodes may be included in one index table block. However, the present disclosure is not limited thereto, and the node in the index tree structure may be included in the index table block in various manners, and the node in the index tree structure may include the index table block in various manners.

The index logical redo log may be generated by second index redo logging corresponding to a data change of an index or by an instruction for recovering an index. Specifically, the index logical redo log may be a redo log generated h an index transaction of inserting, changing, or deleting a data value of an index without changing the index tree structure in index redo logging. Here, the second index redo logging may refer to generation of an index redo log for an index transaction of inserting, changing, or deleting a data value of an index without changing the index tree structure. Thus, the index logical redo log may include index data change information corresponding to an operation of inserting, deleting, or changing a data value of the index, while maintaining the index tree structure. Here, the change of the index tree structure may refer to a change in an index block unit. Data change information may be used for inserting, changing, and deleting a data value without changing the index tree structure in recovery.

For example, the index logical redo log may include data change information generated by an index transaction of inserting a data value into an index. In addition, the index logical redo log may include data change information generated by an index transaction of changing a data value of the index. In addition, the index logical redo log may include data change information generated by an index transaction of deleting a data value from the index. However, the present disclosure is not limited thereto, and the index logical redo log may include data change information for various operations of not changing the index tree structure.

As understood from the above descriptions, index redo logging in the present disclosure may include first index redo logging for generating the index physical redo log and second index redo logging for generating the index logical redo log. However, the index logical redo log may be generated in recovery, not in index redo logging.

Thus, the index logical redo log in the present disclosure may be venerated at two different times. Specifically, the index logical redo log may be generated in index redo logging, similar to the method in the related art (that is, second index redo logging). In addition, the index logical redo log may be generated based on a table redo log, in recovery.

The index redo log according to the present disclosure, which includes the index physical redo log and the index logical redo log will be described with reference to FIG. 5. With reference to FIG. 5, table blocks 610 and 612 in a table to Which an exemplary transaction 600 is applied are provided, and index blocks 630, 631, 632, 633, and 634 in the index, which have been updated by the exemplary transaction 600 are provided.

The transaction 600 illustrated in FIG. 5 is a transaction of inserting data values "(1, 2, 3)" and "(3, 1, 1)" into the table "table_A", It is assumed that the transaction 600 is processed to insert the data value "(1, 2, 3)" into a position having a rowid value of "003" in a table block having a table block number of 3 (see the table block 610), and then to insert the data value "(3, 1, 1)" into a position having a rowid value of "004" in the table block 610 having a table block number of 3 (see the table block 612). Here, a table redo log 620 is a redo log for an operation of inserting the data value "(1, 2, 3)" into the position having a rowid value of "003" in the table block having a table block number of 3. A table redo log 621 is a redo log for an operation of inserting the data value "(3, 1, 1)" into a position having a rowid value of "004" in the table block having a table block number of 3.

In a case where the table is changed by processing the transaction 600, the index may also be updated. The index identifying module 350 may provide information for determining whether or not the index is updated by changing the table. For example, the index identifying module 350 may have information regarding whether or not an index is set, the name of the index, the contents of the index, and the like. For example, with reference to FIG. 5, the index identifying module 350 may have information for recognizing that the index of "index_A" is set for the columns "A" and "B", from information of "index_A(A,B)". Thus, the index identifying module 350 may provide information for determining the index of "index_A" to be updated by applying the change of the table.

According to some exemplary embodiments of the present disclosure, the index identifying module 350 may be a data dictionary. In addition, as another example, the index identifying module 350 may acquire information regarding an index from the data dictionary. However, the present disclosure is not limited thereto, and the index identifying module 350 may provide information for determining whether or not the index is updated, in various manners.

The lower part in FIG. 5 illustrates an update of the index by changing the table. The index may be updated in accordance with an index algorithm to be used, in various manners. The update of the index, which is illustrated in FIG. 5 is an exemplary result. Specifically, it is assumed that an index update as follows is performed by the transaction 600.

Index transaction 1: insert a data value of "(1, 2, 003)" into an index block having an index block number of 5 in an index of "index_A" (see an index block 630)

Index transaction 2: set (initialize) an index block having an index block number of 6 by using some (that is, data values of "(0,0,002)" and "(1,2,003)") among data values stored in the index block having an index block number of 5 in the index of "index_A" (see an index block 631)

Index transaction 3: set (initialize) an index block having an index block number of 6 by using some (that is, data value of "(3,2,001)") among data values stored in the index block having an index block number of 5 in the index of "index_A" (see an index block 631)

Index transaction 4: insert a data value of "(3,1,004)" into an index block having an index block number of 7 in the index of "index_A" (see an index block 634)

Index redo logs 640 to 643 illustrated in FIG. 5 are index redo logs for an index update illustrated in FIG. 5. Specifically, the index redo log 640 is a redo log corresponding to Index transaction 1. The index redo log 641 is a redo log corresponding to Index transaction 2. The index redo log 642 is a redo log corresponding to Index transaction 3. The index redo log 643 is a redo log corresponding to Index transaction 4.

The index redo log 640 and the index redo log 643 may be classified into the index logical redo log in that the index redo logs 640 and 643 have data change information but do not have index tree structure change information. That is, the index redo log 640 and the index redo log 643 are redo logs corresponding to Index transaction 1 and Index transaction 4 of inserting the data value into the index without changing the index tree structure. Thus, in a case where the index redo log 640 and the index redo log 643 are used for recovery, the index tree structure is not changed.

The index redo log 641 and the index redo log 642 may be classified into the index physical redo log in that the index redo logs 641 and 642 have index tree structure change information. With reference to FIG. 5, the index redo log 641 and the index redo log 642 are redo logs corresponding to Index transaction 2 and Index transaction 3 of changing the index tree structure. Index transaction 2 and Index transaction 3 are split transactions of splitting Index block 5 into Index block 6 and Index block 7. Thus, in a case where the index redo log 641 and the index redo too 642 are used for recovery, the index tree structure is changed.

With reference to FIG. 6A, a difference between the index physical redo log and the index logical redo log will be described. According to some exemplary embodiments of the present disclosure, the index physical redo log may include physical information, target index information, operation information, or index data value information. The index logical redo log may include target index information, operation information, and index data value information. The index physical redo log and the index physical redo log illustrated in FIG. 6 are just examples and may have various forms.

Here, the target index information may indicate an index to be recovered. The operation information may indicate an operation performed by the transaction. The index data value information may indicate a data value (for example, index key value and a rowid value) stored in an index block. The index key value is used to identify and access a specific row in an index. Index search may be performed using the index key value. With reference to FIG. 5, in the index of "index_A", the index key value is a value stored in the columns "A" and "B" in the table. The rowid value may indicate a position at which data is stored on the table. Generally, index search may be an operation of reading a rowid value using the index key value (for example, "values stored in the columns "A" and "B"") and accessing data at a table position corresponding to the rowid value.

According to some exemplary embodiments of the present disclosure, physical information may include information regarding the index tree structure. For example, with reference to FIG. 5, the physical information may include the index block number information. In addition, the physical information may include information indicating a connection relation between index blocks constituting the index tree structure. The physical information may be used for changing the index tree structure in recovery. However, the present disclosure is not limited thereto, and the physical information may include various kinds of information regarding the index tree structure.

The physical information of the index may be generally determined by index search for the index tree structure. For example, the processor 120 may perform index search to determine a physical position on an index, which corresponds to an index key value. Specifically, index block number information of each of the index blocks to which the index data value of "(1, 2, 003)" in Index transaction 1 and the index data value of "(3,1,004)" in Index transaction 4 are inserted may be determined by the index search. A physical address used in Index transaction 2 and Index transaction 3 may also be determined by the index search.

That is, the physical information is required when an index transaction is generally processed. Meanwhile, in the index recovery method in the present disclosure, the physical information of the index logical redo log is not stored. Specifically, in the index recovery method in the present disclosure, the physical information of an index logical redo log may not be stored by acquiring the physical information of the index logical redo log in recovery.

With reference to FIG. 6B, index redo logs 650 to 653 are examples of the redo log to be used in index redo logging in the related art. Comparing the index redo logs 640 to 643 according to the present disclosure and the index redo logs 650 to 653 in the related art, it is recognized that the index redo logs 640 to 643 according to the present disclosure does not have physical information (that is, index block information). Thus, the index redo log according to the present disclosure has a data volume smaller than the data volume of the index redo log in the related art. Consequently, in a case using the index redo log according to the present disclosure, it is possible to reduce the volume of log data stored in the storage unit 140.

With reference to FIG. 6C, the index logical redo logs 640 to 643 according to the present disclosure may not be generated in the process of updating the index for the transaction 600. For example, in the index recovery method according to the present disclosure, the index logical redo logs 640 to 643 are generated using the table redo log in recovery. Thus, the index redo logs 640 to 643 may not be generated and stored before recovery. Thus, in the index redo logging method according to the present disclosure, it is possible to reduce the volume of log data stored in the storage unit 140.

An improved type of index redo log used in the index recovery method of the present disclosure will be understood in more detail by describing specific steps of the index recovery method of the present disclosure.

According to some exemplary embodiments of the present disclosure, the index redo logging recovery module 330 may perform index recovery using the improved index redo log of the present disclosure. According to the present disclosure, index recovery may be generally performed by a first recovery step and a second recovery step.

According to some exemplary embodiments of the present disclosure, the index redo logging recovery module 330 may perform the first recovery step of determining, by an instruction for recovering via an index redo log including an index physical redo log and an index logical redo log, an index tree structure by applying the index physical redo log. Here, the index physical redo log is generated by first index redo logging corresponding to a change of the index tree structure as described above. In addition, the index physical redo log includes the index tree structure change information.

As described above, the index physical redo log may include the index tree structure change information. Specifically, the index physical redo log may be a redo log generated by an index transaction of changing the index tree structure. As described above, first index redo logging may refer to generation of an index redo log for an index transaction of changing an index tree structure. Thus, the index physical redo log may include the index tree structure change information. Here, the change of the index tree structure may refer to a change in an index block unit. The index tree structure change information may be used for changing the index tree structure in recovery. For example, in a case where an instruction for recovering is made, the index redo logging recovery module 330 may determine an index physical redo log to be used for recovery, based on a recovery time. The index redo logging recovery module 330 may apply the index physical redo log to the index tree structure as a recovery target, so as to determine the index tree structure.

In this case, the index tree structure is determined by the first recovery step, but some data values in the index block may not be recovered. For example, reference to FIG. 5, in a case where only the index physical redo logs 641 and 642 are applied, an index data value of "(3,1,004)" in an index block having an index block number of 7 is not recovered. A not-recovered data value may be recovered by applying the index logical redo log through the second recovery step.

According to some exemplary embodiments of the present disclosure, the index redo logging recovery module 330 may perform the second recovery step of performing an index tree search on the index tree structure determined by the first recovery step to obtain physical information of the index logical redo log, and applying the index logical redo log to the determined index tree structure using the obtained physical information. Here, the index logical redo log may be generated by second index redo logging corresponding to a data change of an index as described above or by an instruction for recovering. Thus, the index logical redo log may include the index data change information.

In the index redo logging method of the present disclosure, the physical information of the index logical redo log is not stored, but the index tree structure is searched in recovery. Thus, the physical information of the index logical redo log can be acquired. Thus, in the index redo logging method of the present disclosure, firstly, the first recovery step is performed to determine the index tree structure, and then the second recovery step is performed to recover the not-recovered data value.

Describing with reference to FIG. 6B, the index recovery method in the related art, which uses the index redo logs 650 to 653 is performed by applying the index redo logs 650 to 653 in order without distinguishing the index physical redo log and the index logical redo log from each other. That is, since the index redo logs are applied in order, corresponding Index transactions 1 to 4 are processed in order.

The index recovery method using the index redo log according to the present disclosure is performed in a manner that the index tree structure is determined by firstly applying the index physical redo logs 641 and 642, and then the index logical redo logs 640 and 643 are applied on the determined index tree structure. As described above, since the index logical redo log does not have the physical information, the physical information of each index logical redo log is acquired by index tree search on the index tree structure. That is, although the index redo logging according to the present disclosure is to perform a step of performing index tree search in recovery, the index logical redo log can be configured in a form of a small data volume (that is, does not have the physical information) by performing the index redo logging. In addition, in index redo logging according to the present disclosure, since the index logical redo log may not be generated and stored before recovery, it is possible to reduce the total data volume of the index redo log.

According to the unique index recovery method of the present disclosure, the index logical redo log may have two generation times as described above. That is, the index logical redo log may be generated and stored before recovery. That is, the index logical redo log may be generated by index redo logging (that is, second index redo logging). In addition, the index logical redo log may be generated based on the table redo log in recovery.

Firstly, a first generation time at which the index logical redo log is generated and stored before recovery will be described. The first generation time is the same as or similar to a general time at which a redo log is generated. Generally, log data may be generated before the contents are applied to a database, in accordance with a write ahead log (WAL) method, in addition, the index redo log according to the present disclosure may be generated before the transaction is processed. Specifically, the index physical redo log among the index redo logs according to the present disclosure may be generally generated before the transaction is processed.

According to some exemplary embodiments of the present disclosure, the index logical redo log may be generated and stored by index redo logging (specifically, second index redo logging). As described above, the generation time may be referred to as the first generation time. That is, in a case where an index is to be updated by the transaction, the index logical redo log may be generated along with the index physical redo log before an index transaction of updating an index is processed. That is, the index physical redo log and the index logical redo log may be generated by index redo logging. For example, with reference to FIG. 5, the index redo logs 640 to 643 may be generated before the index blocks 630 to 634 are changed by the transaction 600. Such an operation may be referred to as second index redo logging for a transaction. Specifically, as described above, the second index redo logging may refer to generation of an index redo log for an index transaction of inserting, changing, or deleting a data value of an index without changing the index tree structure.

Generally, the index redo log includes indexing instruction information for the corresponding transaction in order to perform the corresponding index transaction again, That is, generally, the index redo log may be generated using the indexing instruction information of the corresponding index transaction.

As described above, according to the present disclosure, the index logical redo log does not include the physical information. Thus, the second index redo logging according to the present disclosure may include at least an operation of generating the index logical redo log by excluding physical information from indexing instruction information for a transaction. For example, in a case where the index transaction includes the physical information, the target index information, the operation information, and the index data value information, the index redo log generation module 310 may generate the index logical redo log using other kinds of information excluding the physical information among kinds of information in the index transaction. On the contrary, the index redo logs 650 to 653 in the related art are different from the index redo log in the present disclosure in that all index redo logs have the physical information.

A second generation time at which the index logical redo log is generated in recovery will be described.

According to some exemplary embodiments of the present disclosure, the index logical redo log may be generated by an instruction for recovering. In this case, the index redo log generation module 310 may generate the index logical redo log based on the table redo log, by the instruction for recovering. That is, the index logical redo log may be generated in recovery, not in index redo logging. This generation time may be referred to as the second generation time. In a case where the index logical redo log is generated by the instruction for recovering, the index logical redo log may be generated based on the table redo log.

A method of generating the index logical redo log at the second generation time will be described with reference to FIG. 7. The index logical redo log is generated in a manner that a change of the table is applied to change (insert, change, delete, or the like) the data value of the index. Thus, the index logical redo log may include the corresponding table redo log (that is, a redo log for a change of the table).

For example, with reference to FIG. 5, the index logical redo log 640 corresponds to the table redo log 620. In addition, the index logical redo log 643 corresponds to a table redo log 621. Thus, the index logical redo logs 640 and 643 may be generated using the corresponding table redo logs 620 and 621, differing from the index physical redo logs 641 and 642. That is, the index physical redo log is to be generated and stored by an index redo log generation operation (that is, first index redo logging) for a transaction (that is, generated and stored at the first generation time). However, the index logical redo log may be generated using the corresponding table redo log, and thus may be generated not only at the first generation time but also at the second generation time.

Specifically, the index logical redo log may be generated through steps as follows by the instruction for recovering. Firstly, in a case where the instruction for recovering is made, the index redo log generation module 310 may determine a recovery time. The index redo log generation module 310 may generate the corresponding index logical redo log using the table redo log after the recovery time.

Specifically, for example, the index redo log generation module 310 may recognize that the index of "index_A" is set for the columns "A" and "B", from information of "index_A (A,B)", by the index identifying module 350. Thus, the index redo log generation module 310 may acquire operation information (that is, "insert") and the index data value of "(1, 2, 003)" of the index logical redo log by using operation information (that is, "insert") and the data value of "(003, 1, 3)" among kinds of information stored in the table redo log 710. Accordingly, the index redo log generation module 310 may generate an index logical redo log 720 using a table redo log 710. With reference to FIG. 5, it is easily understood to those skilled in the related art that, with such a method, the index redo log generation module 310 may generate the index logical redo log 640 using the table redo log 620, and the index redo log generation module 310 may generate the index logical redo log 643 using the table redo log 621.

According to some exemplary embodiments of the present disclosure, the second generation time may be before the second recovery step. The second generation time may be before or after the first recovery step and may be the same time as the first recovery step.

Regardless of the generation time, recovery using the index redo log in the present disclosure may be performed in the same manner. That is, firstly, the first recovery step of determining the index tree structure may be performed. Then, the second recovery step of acquiring the physical information of the index logical redo log by index search on the determined index tree structure and applying the index logical redo log using the acquired physical information may be performed. However, in a case where a generation time of the index logical redo log is the second generation time, a step of generating the index logical redo log by the instruction for recovering is added.

Comparing the first generation time and the second generation time, the index logical redo log is generated and stored in advance at the first generation time. Thus, the step of generating the index logical redo log using the table redo log may not be performed in recovery. However, since the index logical redo log is to be stored until the recovery, in a case where the generation time of the index logical redo log is the first generation time, the total data volume of the index redo log is larger than the data volume at the second generation time.

At the second generation time, the index logical redo log is generated after the recovery. Thus, the total data volume of the index redo log is smaller than the data volume at the first generation time. However, since the index redo log is to be generated in recovery, more resources are consumed in the recovery.

According to some exemplary embodiments of the present disclosure, the generation time of the index logical redo log may be variable before or after the occurrence time of the instruction for recovering. As described above, the generation time of the index logical redo log may be the first generation time or the second generation time. The index logical redo log may be generated at the second generation time in order to reduce the total data volume of the index log to the minimum. In addition, the index logical redo log may be generated and stored at the first generation time in order to reduce resource consumption in recovery.

According to some exemplary embodiments of the present disclosure, the index redo log generation module 310 may compare the total data volume of the index redo log to a predetermined threshold value and determine the generation time of the index logical redo log. For example, in a case where the total data volume of the index redo log exceeds the predetermined threshold value (for example, 1% of the total capacity of the storage unit 140), the index redo log generation module 310 may determine the generation time of the index logical redo log to be the second generation time. In another example, in a case where the total data volume of the index redo log is smaller than the predetermined threshold value (for example, 1% of the total capacity of the storage unit 140), the index redo log generation module 310 may determine the generation time of the index logical redo log to be the first generation time. However, the present disclosure is not limited thereto, and the generation time of the index logical redo log may be determined in various manners.

In the index redo logging method according to the present disclosure, it is possible to reduce the total data volume of the index redo log by using the index redo log including the index physical redo log and the index logical redo log. Specifically, in the index redo logging method according to the present disclosure, it is possible to reduce the data volume of the index redo log by using an index logical redo log having a data volume smaller than the data volume of an index redo log in the related art. In addition, in the index recovery method according to the present disclosure, it is possible to reduce the data volume of the index redo log by generating the index redo log during recovery.

Figure 8:
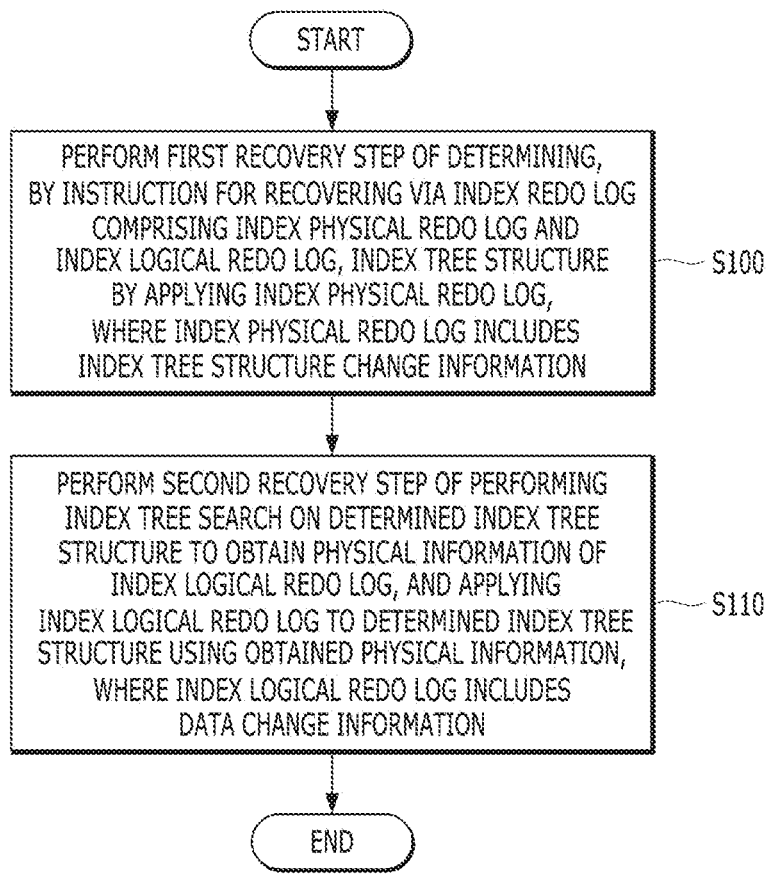
FIG. 8 is a flowchart illustrating the method for index recovery according to some exemplary embodiments of the present disclosure.

FIG. 8 is a flowchart illustrating the method for index recovery according to some exemplary embodiments of the present disclosure.

As described above, the index logical redo too in the index redo log may be generated and stored before the occurrence time of the instruction for recovering. Specifically, in a case where the index logical redo log is generated and stored before the occurrence time of the instruction for recovering (that is, in a case where the index logical redo log is generated by index redo logging), the index recovery method according to the present disclosure is as follows.

According to some exemplary embodiments of the present disclosure, the index recovery method performed by the database server may include the first recovery step of determining, by an instruction for recovering via an index redo log including an index physical redo log and an index logical redo log, an index tree structure by applying the index physical redo log (s100). Here, the index physical redo log may be generated by first index redo logging corresponding to a change of the index tree structure, According to some exemplary embodiments of the present disclosure, the index recovery method performed by the database server 100 may include the second recovery step of performing an index tree search on the determined index tree structure to obtain physical information of the index logical redo log, and applying the index logical redo log to the determined index tree structure using the obtained physical information (s110). Here, the index logical redo log may be generated by second index redo logging corresponding to a data change of an index or by a recovery instruction.

In the index recovery method according to the present disclosure, it is possible to reduce the total data volume of the index redo log by using the index redo log including the index physical redo log and the index logical redo log.

Specifically, in the index redo logging method according to the present disclosure, it is possible to reduce the data volume of the index redo log by using an index redo log having a data volume smaller than the data volume of an index redo log in the related art.

Figure 9:
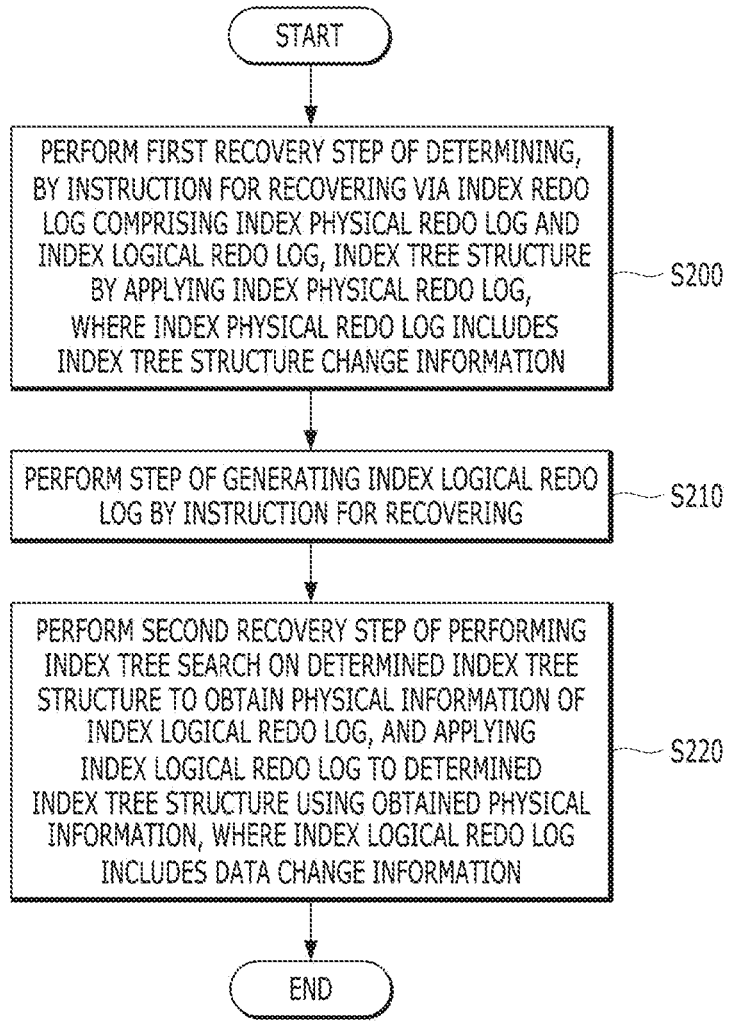
FIG. 9 is another flowchart illustrating the method for index recovery according to some exemplary embodiments of the present disclosure.

FIG. 9 is another flowchart illustrating the method for index recovery according to some exemplary embodiments of the present disclosure.

As described above, the index logical redo log in the index redo log may be generated after the occurrence time of the instruction for recovering. Specifically, in a case where the index logical redo log is generated after the occurrence time of the instruction for recovering, the index recovery method according to the present disclosure is as follows.

According to some exemplary embodiments of the present disclosure, the index recovery method performed by the database server may include the first recovery step of determining, by an instruction for recovering via an index redo log including an index physical redo log and an index logical redo log, an index tree structure by applying the index physical redo log (s200). Here, the index physical redo log may be generated by first index redo logging corresponding to a change of the index tree structure.

According to some exemplary embodiments of the present disclosure, the index recovery method performed by the database server 100 may further include a step (s210) of generating the index logical redo log based on the table redo log by the instruction for recovering. As described above, according to some additional exemplary embodiment of the present disclosure, the step of the generating the index logical redo log based on the table redo log may be performed before or after the first recovery step or may be performed simultaneously with the first recovery step.

According to some exemplary embodiments of the present disclosure, the index recovery method performed by the database server 100 may include the second recovery step of performing an index tree search on the determined index tree structure to obtain physical information of the index logical redo log, and applying the index logical redo log to the determined index tree structure using the obtained physical information (s220). Here, the index logical redo log may include the data change information.

In the index recovery method according to the present disclosure, it is possible to reduce the total data volume of the index redo log by using the index redo log including the index physical redo log and the index logical redo log. Specifically, in the index recovery method according to the present disclosure, it is possible to reduce the data volume of the index redo log by using an index logical redo log having a data volume smaller than the data volume of an index redo log in the related art. In addition, in the index recovery method according to the present disclosure, it is possible to further reduce the total data volume of the index redo log by generating the index logical redo log during recovery.

Figure 10:
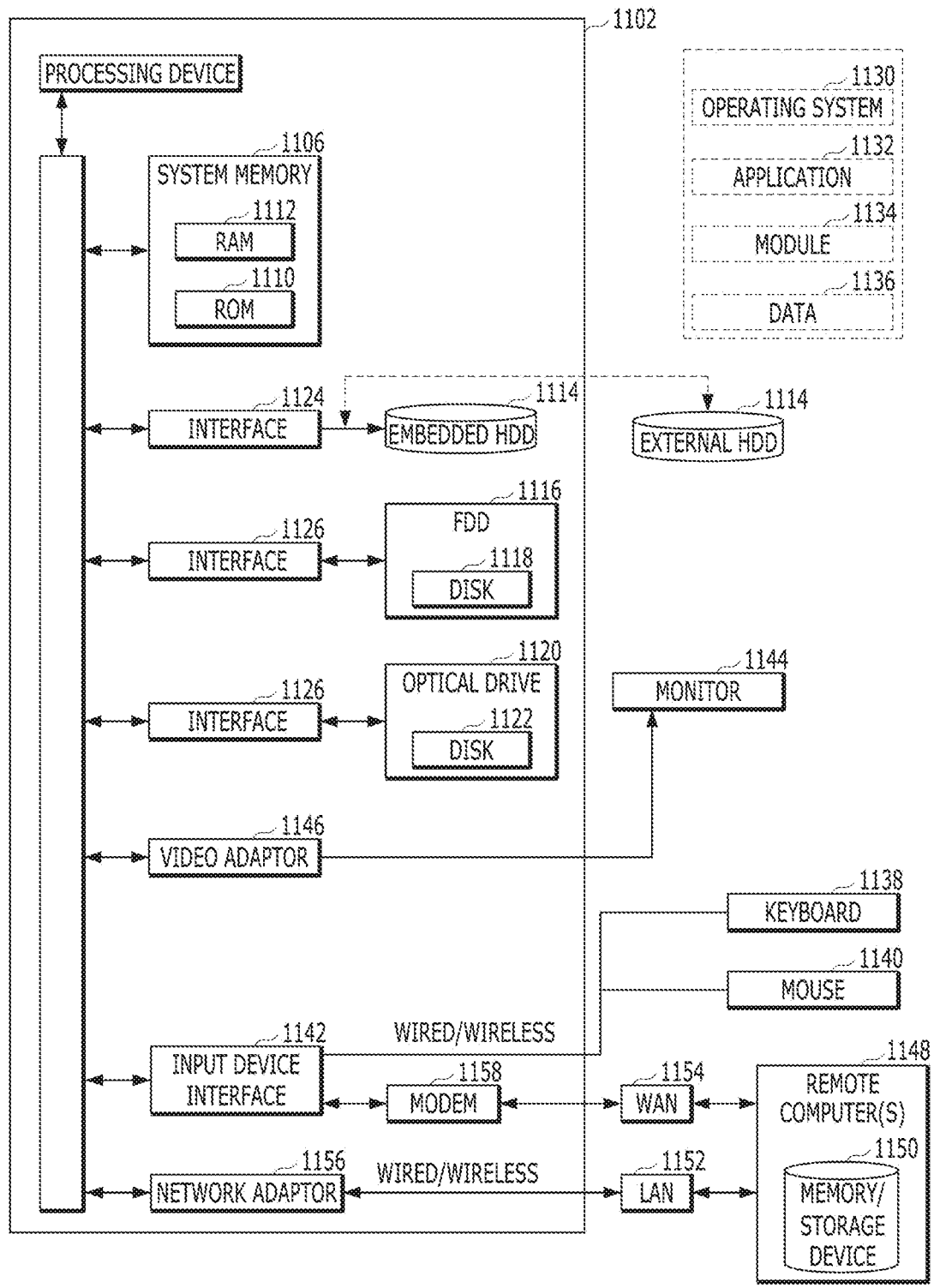
FIG. 10 is a general schematic diagram illustrating an exemplary computing environment in which some exemplary embodiments of the present disclosure can be realized.

FIG. 10 is a general schematic diagram illustrating an exemplary computing environment in which some exemplary embodiments of the present disclosure can be realized.

Although the present disclosure has been described above generally with respect to computer executable instructions that may be executed on one or more computers, those skilled in the related art will appreciate that the present disclosure may be implemented in combination with other program modules and/or in a combination of hardware and software.

Generally, program modules include routines, programs, components, data structures, and the like that perform specific tasks or implement specific abstract data types. In addition, those skilled in the related art will appreciate that the methods of the present disclosure may be implemented by other computer system configuration including single processor or multiprocessor computer systems, minicomputers, mainframe computers, personal computers, handheld computing devices, microprocessor-based or programmable household appliances, other computer systems, and the like (each thereof can be connected to one or more associated device to operate).

The described exemplary embodiments of the present disclosure can also be practiced in distributed computing environments where certain tasks are performed by remote processing devices that are linked through a communications network. In the distributed computing environment, program modules may be located in both local and remote memory storage devices.

Computers typically include various computer readable media. Any medium that can be accessed by a computer can be a computer readable medium, and such a computer readable medium includes volatile and nonvolatile media, transitory and non-transitory media, removable and non-removable media. As an example, not limitation, the computer readable media may include computer readable storage media and computer readable transmission media. The computer readable medium includes volatile and nonvolatile media, transitory and non-transitory media, removable and non-removable media, which are implemented in any method or technology for storing information such as computer readable instructions, data structures, program modules, or other kinds of data. The computer storage medium includes a RAM, a ROM, an EEPROM, a flash memory, or other memory technologies; a CD-ROM, a digital video disk (DVD), or other optical disk storage devices; a magnetic cassette, a magnetic tape, a magnetic disk storage device, or other magnetic storage devices; or any other media which may be accessed by a computer and is used for storing desired information. The present disclosure is not limited thereto.

The computer readable transmission medium generally includes all information transmission media in which computer-readable instructions, data structures, program modules, or other kinds of data are implemented using a carrier wave or a modulated data signal such as other transport mechanisms. The term of the modulated data signal refers to a signal in which one or more of characteristics of the signal are set or changed in order to encode information in the signal. As an example, not limitation, the computer readable transmission medium includes wired media such as a wired network or a direct-wired connection, and wireless media such as sound, RF, infrared rays, and other wireless media. Any combination of the above media is included in the range of the computer readable transmission media.

An exemplary environment 1100 for implementing various aspects of the present disclosure, which includes a computer 1102, is provided. The computer 1102 includes a processing device 1104, a system memory 1106, and a system bus 1108. The system bus 1108 connects system components including the system memory 1106 (not limited thereto) to the processing device 1104. The processing device 1104 may be any processor among various commercially available processors. A dual processor and other multiprocessor architectures may also be used as the processing unit 1104.

As the system bus 1108, any of several types of bus structures that may be additionally interconnected to a memory bus, a peripheral device bus, and a local bus using any of various commercial bus architectures. The system memory 1106 includes a read only memory (ROM) 1110 and a random access memory (RAM) 1112. A basic input output system (BIOS) is stored in a non-volatile memory 1110 such as a ROM, an EPROM, or an EEPROM. The BIOS includes basic routines that help information to be transferred between components in the computer 1102 at the same time as startup. In addition, the RAM 1112 may include a fast RAM such as a static RAM for caching data.

The computer 1102 includes an internal hard disk drive (HDD) 1114 (for example, EIDE and SATA) (this internal hard disk drive 1114 may be configured for external use within a suitable chassis (not illustrated)), a magnetic floppy disk drive (FDD) 1116 (for example, used for reading or writing from or into a removable diskette 1118), and an optical disk drive 1120 (for example, used for reading a CD-ROM disk 1122 or for reading or writing from or into other high-capacity optical media such as a DVD). The hard disk drive 1114, the magnetic disk drive 1116, and the optical disk drive 1120 may be connected to the system bus 1108 through a hard disk drive interface 1124, a magnetic disk drive interface 1126, and an optical drive interface 1128, respectively. The interface 1124 for implementing an external drive includes at least one or both of a universal serial bus (USB) and an IEEE 1394 interface technology.

The above drives and the associated computer readable media provide non-volatile storing of data, data structures, computer executable instructions, and others. In a case of the computer 1102, the drives and media store any kind of data in an appropriate digital type. Although the above descriptions of the computer readable media refer to HDDs, removable magnetic disks, and removable optical media such as CDs or DVDs, those skilled in the art will appreciate that zip drives, magnetic cassettes, flash memory cards, cartridges, and other types of computer readable media may be used in exemplary operating environments, and any medium may contain computer executable instructions for performing the methods in the present disclosure.

An operating system 1130, one or more application programs 1132, other program modules 1134, program data 1136, and multiple program modules may stored in the drives and the RAM 1112. All or some of the operating system, the applications, the modules, and/or data may be cached in the RAM 1112. It will be appreciated that the present disclosure may be implemented in various commercially available operating systems or combinations of operating systems.

A user may input an instruction and information to the computer 1102 with one or more wired/wireless input device, for example, a keyboard 1138 and a pointing device such as a mouse 1140. Other input devices (not illustrated) may include a microphone, an IR remote controller, a joystick, a game pad, a stylus pen, a touch screen, and the like. The input device and other input devices are connected to the processing device 1104 through an input device interface 1142 connected to the system bus 1108, in many cases. However, the input device and other input devices may be connected by other interfaces such as a parallel port, an IEEE 1394 serial port, a game port, a USB port, an IR interface, and the like.

A monitor 1144 or another type of display device is also connected to the system bus 1108 through an interface such as a video adapter 1146. In addition to the monitor 1144, the computer generally includes other peripheral output devices (not illustrated) such as a speaker and a printer.

The computer 1102 may operate in a networked environment using logical connections of remote computer(s) 1148 to one or more remote computers through a wired and/or wireless communication. The remote computer(s) 1148 may be a workstation, a computing device computer, a router, a personal computer, a portable computer, a microprocessor-based entertainment device, a peer device, or other common network nodes. Generally, the remote computer 1148 includes many or all of the components described for the computer 1102, but, for simplicity, only memory storage device 1150 is illustrated. The illustrated logical connections include wired/wireless connections to a local area network (LAN) 1152 and/or a larger network, for example, a wide area network (WAN) 1154. Such LAN and WAN networking environments are common in offices and business companies, facilitate enterprise-wide computer networks such as intranets, and all of which can be connected to worldwide computer networks, for example, the Internet.

When used in a LAN networking environment, the computer 1102 is connected to the local network 1152 via a wired and/or wireless communication network interface or adapter 1156. The adapter 1156 may facilitate a wired or wireless communication to the LAN 1152, and the LAN 1152 also includes a wireless access point installed therein for communicating with the wireless adapter 1156. When used in a WAN networking environment, the computer 1102 may include a modem 1158 or other means that establish a communication over the WAN 1154, for example, is connected to a communication computing device on the WAN 1154 or over the Internet. The modem 1158, which may be an internal or external and wired or wireless device, is connected to the system bus 1108 via a serial port interface 1142. In a networked environment, program modules or some thereof described for the computer 1102 may be stored in a remote memory/storage device 1150. It will be appreciated that the illustrated network connections are exemplary, and other means for establishing communication links between the computers can be used.

The computer 1102 performs an operation of communicating with any wireless device or entity which is disposed and operates in wireless communication, for example, a printer, a scanner, a desktop, and/or a portable computer, a portable data assistant (PDA), a communication satellite, any equipment or place associated with a wireless detectable tag, and a telephone. This includes at least Wi-Fi and the Bluetooth wireless technology. Thus, the communication may be a predefined structure as in a network in the related art or may be simply an ad hoc communication between at least two devices.

Wireless Fidelity (Wi-Fi) allows connection to the Internet without wires. Wi-Fi is a wireless technology, for example, a cell phone that allows such a device, for example, a computer, to transmit and receive data indoors and outdoors, that is, anywhere within the coverage area of a base station. A Vi-Fi network uses a wireless technology called IEEE 802.11 (a, b, g, and the like) to provide secure, reliable, high-speed wireless connections. Wi-Fi may be used to connect computers to each other, to the Internet, and to a wired network (using IEEE 802.3 or Ethernet). The Wi-Fi network may operate in unlicensed 2.4 and 5 GHz wireless bands, for example, at a data rate of 11 Mbps (802.11a) or 54 Mbps (802.11b), or in products that include both bands (dual band).

Those skilled in the art of the present disclosure will appreciate that information and signals may be represented using any of various different technologies and techniques. For example, data, instructions, commands, information, signals, bits, symbols, and chips that may be referenced in the above descriptions may be represented by voltages, currents, electromagnetic waves, magnetic fields or particles, optical fields or particles, or any combination thereof.

Those skilled in the art of the present disclosure will appreciate that various illustrative logical blocks, modules, processors, means, circuits, and algorithm steps described in association with the exemplary embodiments disclosed herein may be implemented by electronic hardware, various forms of program (referred to herein as "software" for convenience), design codes or combinations of all thereof. To clearly describe the interchangeability between hardware and software, various illustrative components, blocks, modules, circuits, and steps have been described above generally in terms of the functionality. Whether such functionality is implemented as hardware or software depends upon the particular application and design constraints imposed on the overall system. Those skilled in the art of the present disclosure may implement the described functionality in various manners for each particular application, but such implementation decisions should not be interpreted as departing from the scope of the present disclosure.

The various exemplary embodiments presented herein may be implemented as a method, an apparatus, or a manufactured article using standard programming and/or engineering techniques. The term of "manufactured article" includes a computer program, a carrier, or media accessible from any computer-readable device. Here, the medium may include a storage medium and a transmission medium. For example, the computer readable medium may include magnetic storage devices example, hard disks, floppy disks, and magnetic strips), optical disks (for example, CDs and DVDs), smart cards, and flash memory devices (for example, EEPROMs, cards, sticks, and key drives), but the present disclosure is not limited thereto. In addition, various storage media presented herein include one or more devices and/or other machine-readable media for storing information. In addition, the transmission medium includes a wireless channel and various other media capable of carrying instruction(s) and/or data, but the present disclosure is not limited thereto.

It is to be understood that the specific order or hierarchy of steps in the presented processes is an example of exemplary approaches. Based on design priorities, it is understood that the specific order or hierarchy of steps in the processes may be rearranged within the scope of the present disclosure. The accompanying method claims present elements of the various steps in a sample order, but are not meant to be limited to the specific presented order or presented hierarchy.

The description of the presented exemplary embodiments is provided to enable any person skilled in the art of the present disclosure to make or use the present disclosure. Various modifications to the exemplary embodiments will be apparent to those skilled in the art of the present disclosure, and the generic principles defined herein may be applied to other exemplary embodiments without departing from the scope of the present disclosure. Thus, it should be construed that the present disclosure is not be limited to the exemplary embodiments presented herein, but is in the broadest scope consistent with the principles and novel features presented herein.

Those skilled in the art of the present disclosure will appreciate that information and signals may be represented using any of various different technologies and techniques. For example, data, instructions, commands, information, signals, bits, symbols, and chips that may be referenced in the above descriptions may be represented by voltages, currents, electromagnetic waves, magnetic fields or particles, optical fields or particles, or any combination thereof.

Those skilled in the art of the present disclosure will appreciate that various illustrative logical blocks, modules, processors, means, circuits, and algorithm steps described in association with the exemplary embodiments disclosed herein may be implemented by electronic hardware, various forms of program (referred to herein as "software" for convenience), design codes or combinations of all thereof. To clearly describe the interchangeability between hardware and software, various illustrative components, blocks, modules, circuits, and steps have been described above generally in terms of the functionality. Whether such functionality is implemented as hardware or software depends upon the particular application and design constraints imposed on the overall system. Those skilled in the art of the present disclosure may implement the described functionality in various manners for each particular application, but such implementation decisions should not be interpreted as departing from the scope of the present disclosure.

The various exemplary embodiments presented herein may be implemented as a method, an apparatus, or a manufactured article using standard programming and/or engineering techniques. The term of "manufactured article" includes a computer program, a carrier, or media accessible from any computer-readable device. Here, the medium may include a storage medium and a transmission medium. For example, the computer readable medium may include magnetic storage devices (for example, hard disks, floppy disks, and magnetic strips), optical disks (for example, CDs and DVDs), smart cards, and flash memory devices (for example, EEPROMs, cards, sticks, and key drives), but the present disclosure is not limited thereto. In addition, various storage media presented herein include one or more devices and/or other machine-readable media for storing information. In addition, the transmission medium includes a wireless channel and various other media capable of carrying instruction(s) and/or data, but the present disclosure is not limited thereto.

It is to be understood that the specific order or hierarchy of steps in the presented processes is an example of exemplary approaches. Based on design priorities, it is understood that the specific order or hierarchy of steps in the processes may be rearranged within the scope of the present disclosure. The accompanying method claims present elements of the various steps in a sample order, but are not meant to be limited to the specific presented order or presented hierarchy.

The description of the presented exemplary embodiments is provided to enable any person skilled in the art of the present disclosure to make or use the present disclosure. Various modifications to the exemplary embodiments will be apparent to those skilled in the art of the present disclosure, and the generic principles defined herein may be applied to other exemplary embodiments without departing from the scope of the present disclosure. Thus, it should be construed that the present disclosure is not be limited to the exemplary embodiments presented herein, but is in the broadest scope consistent with the principles and novel features presented herein.

What is claimed is:

1. A method for recovery of an index performed by a database server, comprising:

performing a first recovery step of determining, by an instruction for recovering via an index redo log comprising an index physical redo log and an index logical redo log, an index tree structure by applying the index physical redo log, wherein the index physical redo log is generated by first index redo logging corresponding to a change of the index tree structure;

performing a second recovery step of performing an index tree search on the determined index tree structure to obtain physical information of the index logical redo log, and applying the index logical redo log to the determined index tree structure using the obtained physical information, wherein the index logical redo log is generated by second index redo logging corresponding to a data change in the index or generated based on a table redo log by the instruction for recovering.

2. The method of claim 1, wherein the index logical redo log is generated by excluding at least the physical information among indexing instruction information for a transaction during the second index redo logging.

3. The method of claim 1, wherein the index logical redo log is generated using operation information and data value information included in the table redo log when the index logical redo log is generated by the instruction for recovering.

4. The method of claim 1, wherein the index physical redo log and the index logical redo log are distinguished by a presence or absence of the physical information.

5. The method of claim 1, wherein the index physical redo log includes index structure change information corresponding to an index split operation or an index coalesce operation.

6. The method of claim 5, wherein the index structure change information includes data information that a node has, wherein the node is added or deleted by changing the index tree structure.

7. The method of claim 1, wherein the index logical redo log includes index data change information corresponding to an operation of inserting, deleting, or changing data in the index.

8. The method of claim 1, wherein the index physical redo log includes at least one of physical information, target index information, operation information, or index data value information, and
wherein the index logical redo log includes at least one of target index information, operation information, or index data value information.

9. The method of claim 1, wherein a generation time of the index logical redo log is variable before or after an occurrence time of the instruction for recovering.

10. A database server for performing a method for recovery of an index, comprising:
a processor; and
a storage unit,
wherein the processor performs:
a first recovery step of determining, by an instruction for recovering via an index redo log comprising an index physical redo log and an index logical redo log, an index tree structure by applying the index physical redo log, wherein the index physical redo log is generated by first index redo logging corresponding to a change of the index tree structure;
a second recovery step of performing an index tree search on the determined index tree structure to obtain physical information of the index logical redo log, and applying the index logical redo log to the determined index tree structure using the obtained physical information, wherein the index logical redo log is generated by second index redo logging corresponding to a data change in the index or generated based on a table redo log by the instruction for recovering.

11. The database server of claim 10, wherein the index logical redo log is generated by excluding at least the physical information among indexing instruction information for a transaction during the second index redo logging.

12. The database server of claim 10, wherein the processor generates the index logical redo log using operation information and data value information included in the table redo log when the index logical redo log is generated by the instruction for recovering.

13. The database server of claim 10, wherein the index physical redo log and the index logical redo log are distinguished by the presence or absence of the physical information.

14. The database server of claim 10, wherein the index physical redo log includes index structure change information corresponding to an index split operation or an index coalesce operation.

15. The database server of claim 14, wherein the index structure change information includes data information of a node which is added or deleted by changing the index tree structure.

16. The database server of claim 10, wherein the index logical redo log includes index data change information corresponding to an operation of inserting, deleting, or changing data in the index.

17. The database server of claim 10, wherein the index physical redo log includes at least one of physical information, target index information, operation information, or index data value information, and
wherein the index logical redo log includes at least one of target index information, operation information, or index data value information.

18. The database server of claim 10, wherein a generation time of the index logical redo log is variable before or after an occurrence time of the instruction for recovering.

19. A non-transitory computer readable medium having recorded thereon a program executable by a processor to perform a method for recovery of an index, the method comprising:
performing a first recovery step of determining, by an instruction for recovering via an index redo log comprising an index physical redo log and an index logical redo log, an index tree structure by applying the index physical redo log, wherein the index physical redo log is generated by first index redo logging corresponding to a change of the index tree structure;
performing a second recovery step of performing an index tree search on the determined index tree structure to obtain physical information of the index logical redo log, and applying the index logical redo log to the determined index tree structure using the obtained physical information, wherein the index logical redo log is generated by second index redo logging corresponding to a data change in the index or generated based on a table redo log by the instruction for recovering.

* * * * *